Feb. 11, 1936.   L. A. CARTER   2,030,097
SETTING AND INDICATING DEVICE FOR GEARED LATHE HEADSTOCKS
Filed Aug. 10, 1934   2 Sheets-Sheet 1
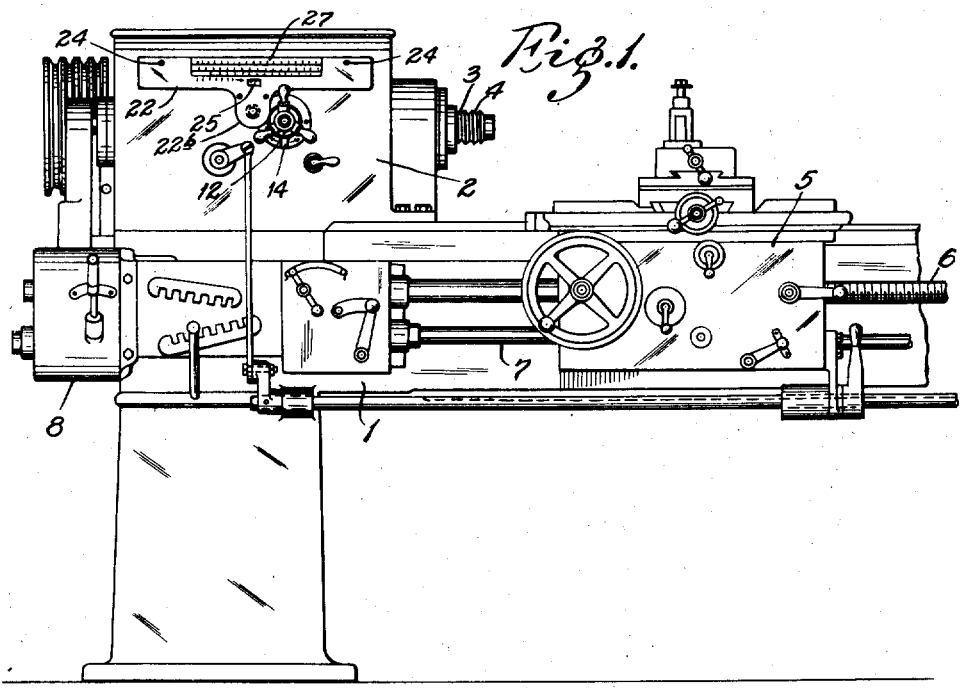
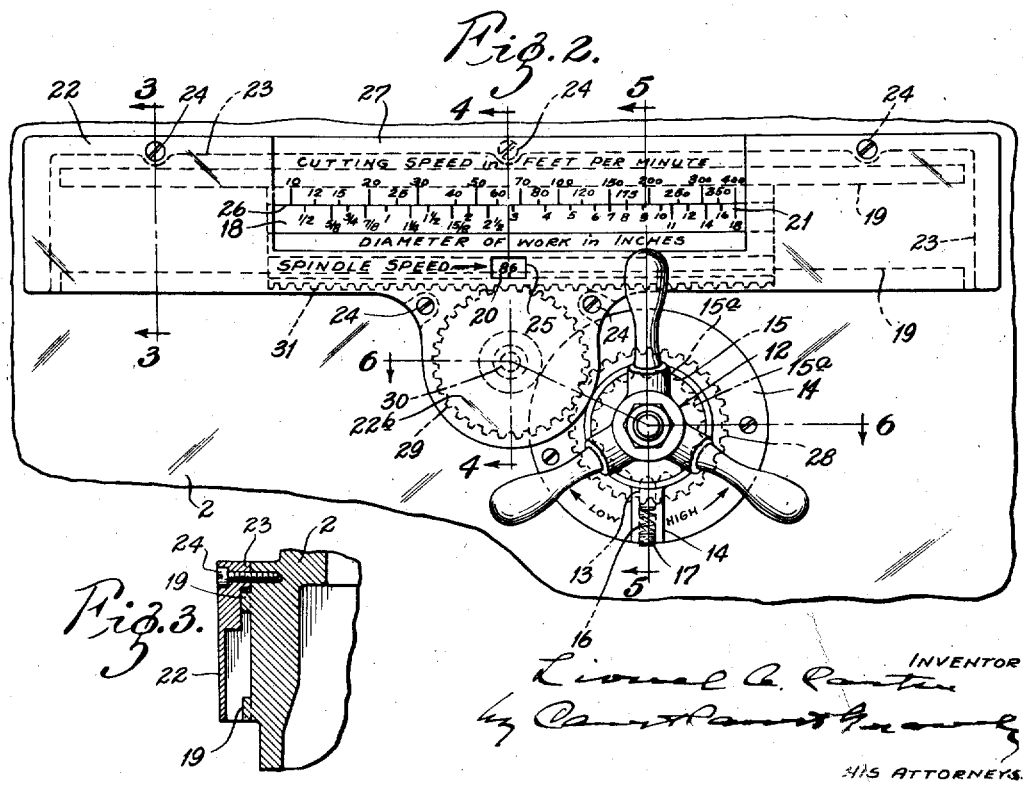

Feb. 11, 1936. L. A. CARTER 2,030,097
SETTING AND INDICATING DEVICE FOR GEARED LATHE HEADSTOCKS
Filed Aug. 10, 1934 2 Sheets-Sheet 2
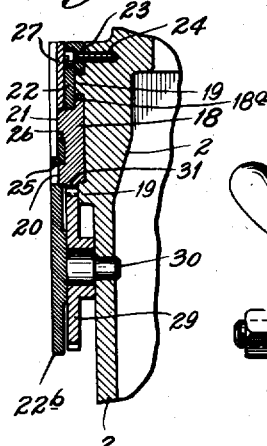
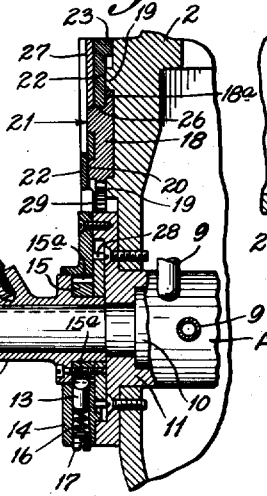
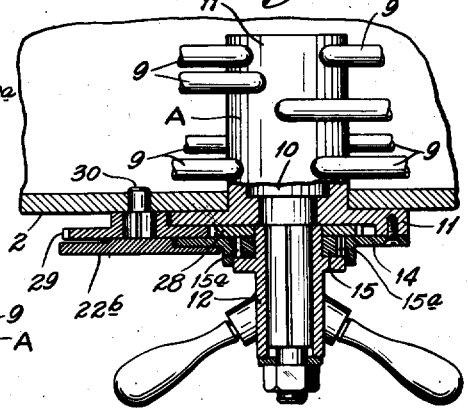
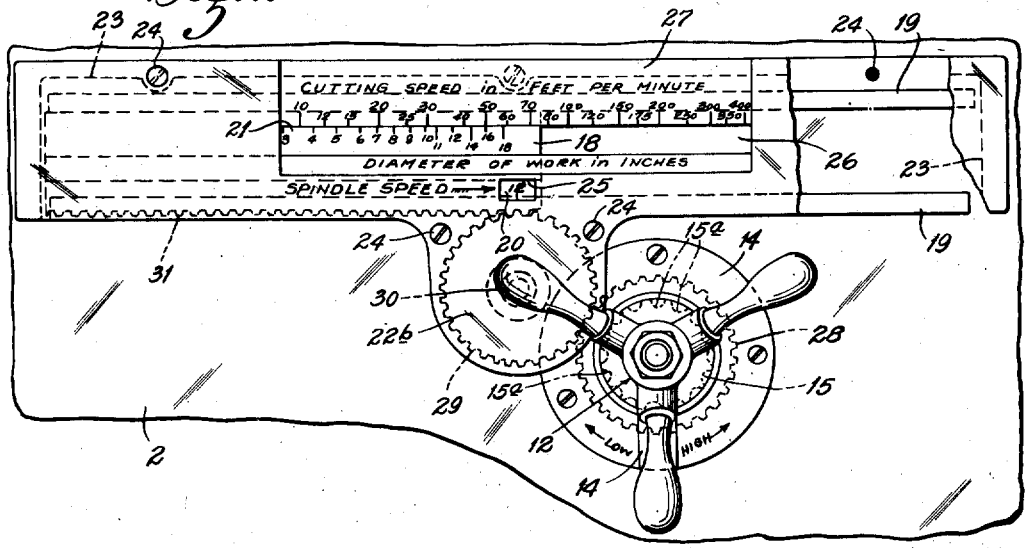
INVENTOR
Lionel A. Carter
HIS ATTORNEYS Patented Feb. 11, 1936

2,030,097

UNITED STATES PATENT OFFICE 2,030,097

SETTING AND INDICATING DEVICE FOR GEARED LATHE HEADSTOCKS

Lionel A. Carter, Webster Groves, Mo.

Application August 10, 1934, Serial No. 739,205

8 Claims. (Cl. 116—124)

This invention relates to setting and indicating devices for change speed mechanisms, particularly change speed mechanisms for geared lathe headstocks of the type shown in my application Serial No. 721,974 wherein the desired selected spindle speeds are obtained by means of a single control handle.

The invention has for its principal object to provide a simple, compact and easily readable device, operable by the speed control handle of the change speed mechanism, for setting the control member to obtain approximate circumferential cutting speed required for the work, and for indicating and for checking said speed. The invention consists in the setting and indicating device and in the construction, combinations and arrangements of parts hereinafter described and claimed.

In the accompanying drawings, wherein like symbols refer to like parts wherever they occur, Fig. 1 is a front elevational view of a portion of a lathe having a fluid operated change speed spindle driving mechanism provided with a setting and indicating device embodying my invention, Fig. 2 is an enlarged fragmentary front elevation of the geared head, control handle and the setting and indicating mechanism therefor, the handle being set to obtain a spindle speed of eighty-six revolutions per minute, Figs. 3, 4, and 5 are fragmentary vertical sections taken on the lines 3—3, 4—4 and 5—5, respectively, in Fig. 2, Fig. 6 is a fragmentary section taken on the line 6—6 in Fig. 2, Fig. 7 is a view similar to Fig. 2, the speed control handle set to obtain a spindle speed of twelve revolutions per minute; and Fig. 8 is a front elevation of the slide plate on which are located the respective scales indicating the different spindle speeds and work diameters.

In the accompanying drawings, my invention is shown in connection with a geared head engine lathe comprising a bed 1 provided with a headstock 2 containing a suitable change speed gearing (not shown) for driving at different selected speeds a spindle 3 provided at its forward end with the usual work-supporting chuck or face plate 4, a carriage 5 slidable on said bed toward and away from said headstock, a lead screw 6 for sliding said carriage when thread cutting, a feed rod 7 for sliding said carriage when doing work other than thread cutting, and a housing 8 located below said headstock and containing a suitable change speed mechanism (not shown) for driving said lead screw and said feed rod at different selected speeds. The construction of the geared head engine lathe thus far described is well-known and it is considered unnecessary to illustrate it in detail.

The headstock 2 is provided with a fluid clutch operated change speed mechanism (not shown) of the kind shown in my application Serial No. 721,974 wherein sixteen spindle speeds are secured by manipulation of a single control valve A mounted on the headstock 2 and controlling the passage of the fluid through pipes 9 leading to the different fluid operated clutches (not shown). Said control valve A comprises a ported core 10 rotatably mounted in a cylindrical casing 11, which is fixed in an opening provided therefor in the front wall of the headstock 2 and is provided with ports for establishing communication with the pipes 9 and the ported valve case, all as shown and described in detail in the above mentioned application. The valve core 10 is rotated in the valve casing 11 by means of a member 12 comprising a hub portion that is keyed to the forward end of said valve core outside of the headstock and is provided with three radially extending handle portions.

The rotary valve core 10 of the speed control valve A is accurately located in the sixteen different positions of its rotary adjustment by means of a plunger 13 that is slidably mounted in a vertical bore provided therefor in an annular plate 14 secured to the front end of the valve casing 11. The plunger 13 has a rounded inner end portion that is adapted to cooperate within any of the sixteen circumferentially spaced pockets 15a or recesses formed in the periphery of an annular locating plate 15 that is fixed to the hub of the spindle speed control handle 12 for rotation therewith and works in a recess provided therefor in the plate 14. The core locating or positioning plunger 13 is forced into the pocket 15a located opposite thereto by means of a coil spring 16 interposed between said plunger and a threaded plug 17 which closes the outer end of the plunger receiving bore. With this arrangement, the spring pressed plunger is held in engagement with the pocket engaged thereby with sufficient pressure to keep the valve core in the desired position of its angular adjustment, but said pressure is not sufficient to prevent said core from being manually rotated by the valve operating handle 12.

Mounted on the headstock adjacent to the control valve A is a setting and indicating mechanism comprising a plate 18 mounted for horizontal sliding movement between two vertically spaced horizontally disposed ribs 19 formed integral with the exterior face of the headstock 2 just above said valve. The lower front face of the slide plate 18 has a scale 20 extending longitudinally thereof whose graduations indicate in revolutions per minute the sixteen different spindle speeds that may be obtained by manipulating the control valve A. Said slide plate is also provided above the spindle speed scale 20 with a longitudinal scale 21 whose graduations indicate in inches and fractions thereof different diameters of work. The sliding scale plate 18 is slidably held in position between the ribs 19 on the headstock 2 by means of a cover plate 22 that is provided at its side and upper edges with a rib 23 that rests against the face of the headstock and is secured to said headstock by means of cap screws 24. The cover plate 22 is provided opposite the spindle speed scale 20 with an index opening or window 25 through which may be observed any number on said scale when that number is brought into position opposite to said window. The cover plate 22 is also provided above the window 25 with a horizontally extending opening or slot 26 through which the entire work diameter scale 21 may be observed when the slide plate 18 is centered back of said slot. The slide plate 18 is offset rearwardly, as at 18a, above the slot 26 to accommodate a plate 27 which extends from end to end of said slot and is welded to the rearwardly offset portion of said cover plate 22. The lower edge of the plate 27 is disposed flush with the upper edge of the slot and has a scale marked thereon whose graduations are provided with numbers indicating in feet per minute different circumferential cutting speeds for the work.

The slide plate 18 is slid horizontally in its slideway by means of two intermeshing gears 28 and 29, respectively. The driving gear 28 is mounted on the hub of the valve manipulating handle 12 so as to rotate therewith and is located between the forward end of the valve casing 11 and the annular plate 15 having the pockets 15a thereon for the valve locating or positioning plunger 13. The driven gear 29 is keyed to a stub shaft 30 that is journaled in an opening provided therefor in the headstock housing; and said gear and shaft are held in place and covered by portion 22b of the cover plate that depends therefrom midway of the ends thereof. The driven gear 29 is located below the slide plate 18 and intermeshes with a longitudinal rack 31 formed on the lower edge of said plate, whereby rotation of said driven gear causes said plate to slide endwise in its slideway. By the arrangement described, rotation of the control valve operating handle 12 causes the slide plate 18 to slide endwise in its slideway, the parts being so related that when the plunger 13 is seated within any one of the sixteen pockets 15a provided therefor in the annular locating plate 15, the number indicating the spindle speed obtained by such position of the valve will appear in the window 25.

The setting and indicating device operates as follows: Assuming that the work to be operated upon has a diameter of two and three-fourths inches and requires a circumferential cutting speed of sixty-three feet per minute, the handle 12 is rotated to bring the portion of the work diameter scale 21 midway between the graduations marked two and one-half and three thereon opposite the space between the graduations marked sixty and seventy on the scale 27 indicating the cutting speed. In this position of the parts, if the spring-pressed plunger 13 is not seated in a pocket 15a, the handle is moved slightly to cause the plunger to seat in the closest pocket, thereby setting the valve in the position that will obtain the closest spindle speed that may be secured within the range of speed changes available. In the example given and as illustrated in Fig. 2, the spindle speed will be eighty-six revolutions per minute and the number eighty-six will appear in the window 25 of the cover plate 22 of the setting and indicating mechanism. Fig. 7 shows the valve A set for a spindle speed of twelve revolutions per minute for rotating work of 5 inches in diameter at a circumferential cutting speed of 12 feet per minute.

When it is desired to check the setting of the change speed headstock, the operator or supervisor determines the diameter of the work and the circumferential cutting speed required therefor and then inspects the indicating mechanism to see whether the graduation indicating the diameter of the work is in register with or close to the graduation indicating the circumferential cutting speed required for said work. If these two graduations are in register with or in close proximity to each other, it indicates that the spindle is being rotated at the nearest speed obtainable for the required cutting speed.

Obviously, the hereinbefore described arrangement admits of considerable modification without departing from the invention. Therefore, I do not wish to be limited to the precise construction shown and described.

What I claim is:

1. In a change speed driving mechanism for a spindle, a control member for said mechanism, and a setting and indicating device for said control member and operated solely thereby, said device comprising a slidably mounted plate provided with a scale marked to designate the different spindle speeds, and an operative connection between said control member and said slidably mounted plate for sliding the latter when the former is actuated, said scale being adapted to cooperate with a stationary index for indicating the spindle speed for which the transmission control member is set.

2. In a change speed driving mechanism for a lathe spindle, a control member for said mechanism, and a setting and indicating device for said control member and operated solely thereby, said device comprising a plate mounted for sliding movement on said lathe and having a scale marked thereon with numbered graduations designating the different spindle speeds, an operative connection between said control member and said slidable plate for sliding the latter when the former is actuated, and a cover fixed to said lathe and covering said slide plate, said cover plate being provided opposite said scale with an opening of a size adapted to uncover the numbered graduation corresponding to the spindle speed for which the transmission control member is set.

3. In a change speed driving mechanism for a lathe spindle, a rotary control member for said mechanism, and a setting and indicating device for said control rotary member and operated solely thereby, said device comprising a slidably mounted plate provided with a scale marked to designate the different spindle speeds and a scale marked to designate different diameters of work, an operative connection between said rotary control member and said slidably mounted plate for sliding the latter when the former is rotated, the spindle speed scale being adapted to cooperate with a stationary index for indicating the spindle speed for which the rotary transmission control member is set, and a stationary scale marked to designate different circumferential cutting speeds for the work and cooperating with the diameter designating scale of said slide plate.

4. In a change speed driving mechanism for a lathe spindle, a rotary control member for said mechanism, and a setting and indicating device for said rotary control member and operated solely thereby, said device comprising a plate slidably mounted on said lathe and having a scale marked with graduations designating the different spindle speeds and a scale marked with graduations designating different diameters of work, an operative connection between said rotary control member and said slidable plate for imparting a longitudinal sliding movement to the latter when the former is rotated, a cover plate fixed to said lathe and covering said slide plate, said cover plate being provided with an index opening adapted to uncover a single graduation of said spindle scale and an opening located opposite to and of a length corresponding substantially to the length of said diameter scale, and a third scale located on said cover plate marked to designate different circumferential cutting speeds for the work and cooperating with the diameter scale on said slide plate.

5. In a change speed driving mechanism for a lathe spindle, a rotary control member for said mechanism, and a setting and indicating device for said control member, said device comprising a slidably mounted plate provided with a scale marked to designate the different spindle speeds, a driving gear fixed to said rotary control member, a gear intermeshing with and driven by said driving gear, and a rack on said slide plate intermeshing with and driven by said driven gear, said scale being adapted to cooperate with a stationary index for indicating the spindle speed for which the rotary transmission control member is set.

6. In a change speed driving mechanism for a lathe spindle, a rotary control member for said mechanism, and a setting and indicating device for said control rotary member, said device comprising a slidably mounted plate provided with a scale marked to designate the different spindle speeds and a scale marked to designate different diameters of work, a driving gear fixed to said control member, a gear intermeshing with and driven by said driving gear, a rack on said slide plate intermeshing with said driven gear, the spindle speed scale being adapted to cooperate with a stationary index for indicating the spindle speed for which the rotary transmission control member is set, and a stationary scale marked to designate different circumferential cutting speeds for the work and cooperating with the diameter designating scale of said slide plate.

7. In a change speed driving mechanism for a lathe spindle, a rotary control member for said mechanism, and a setting and indicating device for said control member, said device comprising a slidably mounted plate provided with a scale marked to designate the different spindle speeds, a driving gear fixed to said rotary control member, a gear intermeshing with and driven by said driving gear, a rack on said slide plate intermeshing with and driven by said driven gear, said scale being adapted to cooperate with a stationary index for indicating the spindle speed for which the rotary transmission control member is set, said control member having a multiplicity of circumferentially spaced pockets in the periphery thereof corresponding to the number of spindle speeds obtained by said change speed mechanism, and a spring-pressed plunger adapted to seat within any one of said pockets when the latter is positioned opposite said plunger.

8. In a change speed driving mechanism for a lathe spindle, a rotary control member for said mechanism, and a setting and indicating device for said control rotary member, said device comprising a slidably mounted plate provided with a scale marked to designate the different spindle speeds and a scale marked to designate different diameters of work, a driving gear fixed to said control member, a gear intermeshing with and driven by said driving gear, a rack on said slide plate intermeshing with said driven gear, the spindle speed scale being adapted to cooperate with a stationary index for indicating the spindle speed for which the rotary transmission control member is set, a stationary scale marked to designate different circumferential cutting speeds for the work and cooperating with the diameter designating slide of said slide plate, said control member having a multiplicity of circumferentially spaced pockets in the periphery thereof corresponding to the number of spindle speeds obtained by said change speed mechanism, and a spring-pressed plunger adapted to seat within any one of said pockets when the latter is positioned opposite said plunger.

LIONEL A. CARTER.